Dec. 26, 1961  H. L. BERRY  3,014,217
CORRUGATED TUBE AND BRAIDED SLEEVE SYSTEM FOR IMPROVED
MOBILITY IN A FLEXIBLE PRESSURE SYSTEM
Filed April 28, 1959

INVENTOR.
Herbert Lee Berry
BY
Arthur L. Collins
Attorney

United States Patent Office …

3,014,217
Patented Dec. 26, 1961

3,014,217
CORRUGATED TUBE AND BRAIDED SLEEVE SYSTEM FOR IMPROVED MOBILITY IN A FLEXIBLE PRESSURE SYSTEM
Herbert Lee Berry, Alhambra, Calif., assignor to the United States of America as represented by the Secretary of the Navy
Filed Apr. 28, 1959, Ser. No. 809,581
4 Claims. (Cl. 2—2.1)
(Granted under Title 35, U.S. Code (1952), sec. 266)

The invention described herein may be manufactured and used by or for the Government of the United States of America for governmental purposes without the payment of any royalties thereon or therefor.

This invention relates to the construction of pressurized suits and more particularly to the construction of the inner or enclosing suit and the specific means utilized to enclose and restrain the inner suit to thereby obtain certain advantageous results.

Heretofore, pressurized suits utilizing compressed air or some other fluid under pressure have failed to possess the desired mobility under many conditions of use. This lack of mobility was especially apparent in the joints of pressurized suits such as the knee and elbow joints. Furthermore, upon expansion and retraction, the suits oftentimes did not return to their original retracted state. The present invention eliminates these inherent disadvantages in pressurized suits.

It is an object therefore of the present invention to provide a pressurized suit which permits a great degree of mobility to the wearer.

It is a further object of the invention to provide a pressurized suit which after repeated use always returns to its original unstretched position.

It is still another object of the invention to provide a pressurized suit having joints therein which after expansion and retraction will return to their original retracted state and which will permit the wearer of the suit a great degree of mobility.

Other objects and advantages of the present invention will become readily apparent to those skilled in the art from the following detailed description of two embodiments thereof taken in connection with the accompanying drawings, wherein.

Figure 1:
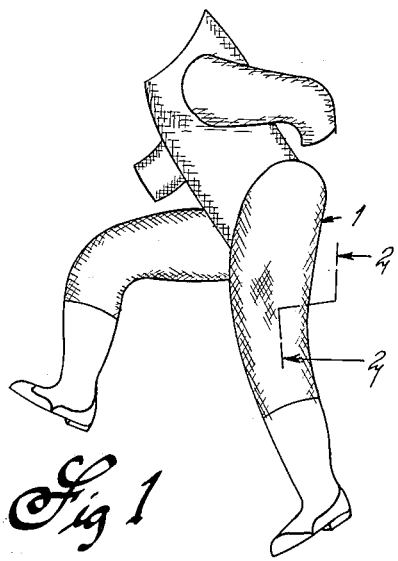
FIG. 1 is a side elevation of a pressurized suit embodying the present invention.
Figure 2:
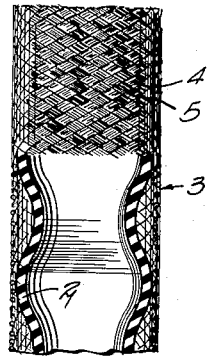
FIG. 2 is an enlarged section of a segment of the suit shown in FIG. 1.

Basically, a pressurized suit constructed in accordance with the present invention is comprised of two fundamental units, (a) an inner, air-containing tube having axially spaced corrugations and (b) an outer covering sleeve or restraining jacket. FIG. 1 shows a portion of an entire suit as would be worn by a wearer. The inner tube or tubular member 2 is corrugated or takes the form of a modified type of bellows (FIG. 2). The effect of such a design is to have the air or other compressed fluid restrict the expansion of the tube in the transverse direction but permit free unfolding or free expansion in the longitudinal direction. If the inner tube 2 were unrestrained, it could possibly double in length.

The outer sleeve or restraining jacket 3 prevents this undesirable extension in length and it may take many possible forms. One form or embodiment is best shown in FIG. 2 and consists of oblique threads or fibers, 4, 5, which move freely and independently and are wound about the inner tube 2 in helix shaped coils. This form of the restraining jacket is comprised of a braided sleeve commonly known as the trick Chinese finger stall. Fibers 4, 5 are braided rather than woven since each thread must both slide and pivot independently of the other threads.

Figure 4:
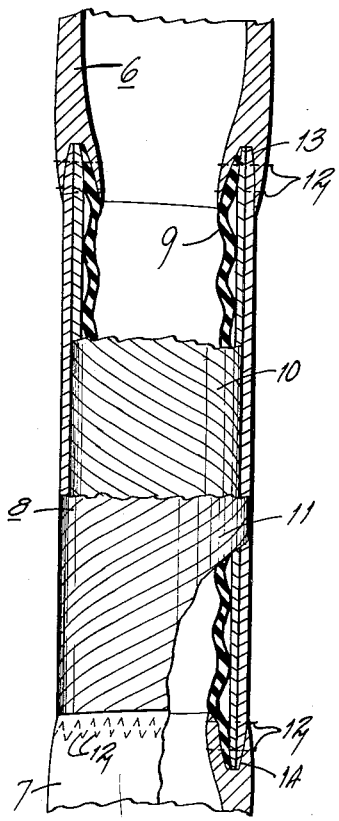
FIG. 4 is a side elevation with parts shown in section of a portion of the leg assembly shown in FIG. 3 and illustrating the construction of the knee joint therein.
Figure 3:
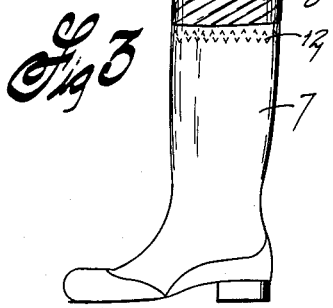
FIG. 3 is a side elevation of a leg assembly of a pressurized suit illustrating a preferred embodiment of the invention.

FIGS. 3 and 4 show the preferred form of the invention wherein the outer restraining jacket or sleeve for the corrugated tubular member takes the form of a plurality of layers of spirally wound strips of flexible tape or the like. This embodiment of the invention is illustrated in connection with a leg assembly of a pressurized suit which includes an upper leg portion 6, a boot member 7 and a flexible knee-joint assembly 8 which connects the leg portion and the boot member. The knee-joint assembly is comprised of a segment of corrugated rubber tubing 9 (FIG. 4) which carries, in this instance, a restraining jacket consisting of two layers 10 and 11 of spirally and reversely wound strips of tape, a plurality of separate and individual strips of tape being utilized in each layer. The opposite ends of the tubing 9 and restraining jacket are anchored to the upper leg portion 6 and boot member 7 by stitching 12, a zig-zag stitch preferably being utilized so as to firmly anchor each strip of tape. Recesses 13 and 14 in the ends of the upper leg portion 6 and boot member 7, respectively, are adapted to receive the opposite ends of the tubing 9 and restraining jacket and also serve in combination with the stitching to provide a substantially fluid-tight seal.

In order for the restraining jacket to effectively restrain the tubular segment 9, the strips of tape must of necessity be made of a material or fabric which will permit transverse stretching but which will resist any longitudinal extension thereof, bias-cut nylon preferably being utilized although it will be apparent that any other material or fabric having these physical properties under load can be successively employed. Furthermore, at least two layers of the reversely spiralled strips must be utilized, the reverse spiral of each layer tending to balance the forces acting on the two layers when the jacket is placed in tension. The upper leg portion 6 and the boot member 7 may be constructed of any suitable material capable of retaining a pressurized fluid, it being preferable in most instances to utilize rubber or a rubber-impregnated silk fabric.

In function, each of the systems noted above is identical to the other. Thus, compressed air is admitted into the space between the corrugated tube and the body of the wearer. The air expands the tube transversely and longitudinally. However, due to the restraining outer covering, the transverse or radial expansion is limited to the inner diameter of the outer jacket. At the same time, since the ends of the tube and outer jacket are tied together, or connected by stitching or the like, the tendency for longitudinal expansion of the tube is diminished somewhat and is limited by the longitudinal extension of the restraining jacket.

Obviously many modifications and variations of the present invention are possible in the light of the above teachings. It is therefore to be understood that within the scope of the appended claims the invention may be practiced otherwise than as specifically described.

What is claimed is:

1. In a leg assembly of a flying suit or the like adapted to carry fluid under pressure and including an upper leg portion and a boot member, a flexible and mobile knee-joint connecting said upper leg portion and said boot member and being operable to carry pressurized fluid comprising a resilient and axially corrugated tubular member of gas impervious material which is adapted to restrict the expansion of the tube in the transverse direction but permit free expansion in the longitudinal direction, a plurality of layers of spirally wound strips of tape enveloping said tubular member and being operable to limit the longitudinal extension of said tubular member when said pressurized fluid acts thereon, and stitching means rigidly anchoring the opposite ends of said tubular member and said plurality of spirally wound strips to said upper leg portion and said boot member, respectively, to thereby hold said upper leg portion, said boot member and said knee-joint in assembled engagement, said strips of tape in each of said layers being made of nylon fabric resistant to longitudinal stretching under load but capable of being transversely stretched, said strips in each layer being spirally wound in opposite directions to thereby balance the forces acting on each layer in response to an axial load applied to said corrugated tubular member by said pressurized fluid acting thereon.

2. In a leg assembly as claimed in claim 1 wherein said tubular member is made of rubber and is enveloped by two layers of spirally wound strips.

3. In a leg assembly as claimed in claim 1 wherein said stitching means is comprised of zig-zag stitches.

4. In an inflatable garment a flexible coupling for encasing a limb-joint comprising a gas impervious corrugated tube having axially spaced corrugations of resiliently stretchable material which is adapted to restrict the expansion of the tube in the transverse direction but permit free expansion in the longitudinal direction, a first tubular outer member encircling said gas impervious tube, a second tubular outer member surrounding said first tubular member, each of said outer members comprising a plurality of spirally wound strips of flexible material resistant to longitudinal stretching but capable of transverse stretching, said strips of one of said outer members being reversely wound respective to that of the other outer member, and means securing the ends of said gas impervious tube and outer members together.

References Cited in the file of this patent

UNITED STATES PATENTS

| | | |
|---|---|---|
| 1,286,107 | Renner | Nov. 26, 1918 |
| 2,238,058 | Johnson et al. | Apr. 15, 1941 |
| 2,355,038 | Barnard | Aug. 1, 1944 |
| 2,392,992 | Martin | Jan. 15, 1946 |
| 2,401,990 | Van Orman | June 11, 1946 |
| 2,515,929 | Ofeldt | July 18, 1950 |
| 2,738,993 | Wilson | Mar. 20, 1956 |
| 2,834,965 | Flagg et al. | May 20, 1958 |
| 2,836,181 | Tapp | May 27, 1958 |

FOREIGN PATENTS

| | | |
|---|---|---|
| 685,812 | Great Britain | Jan. 14, 1953 |